Oct. 27, 1931.　　　F. A. BULLINGTON　　　1,829,391
ROTARY INTERNAL COMBUSTION ENGINE
Original Filed Jan. 14, 1927　　2 Sheets-Sheet 1
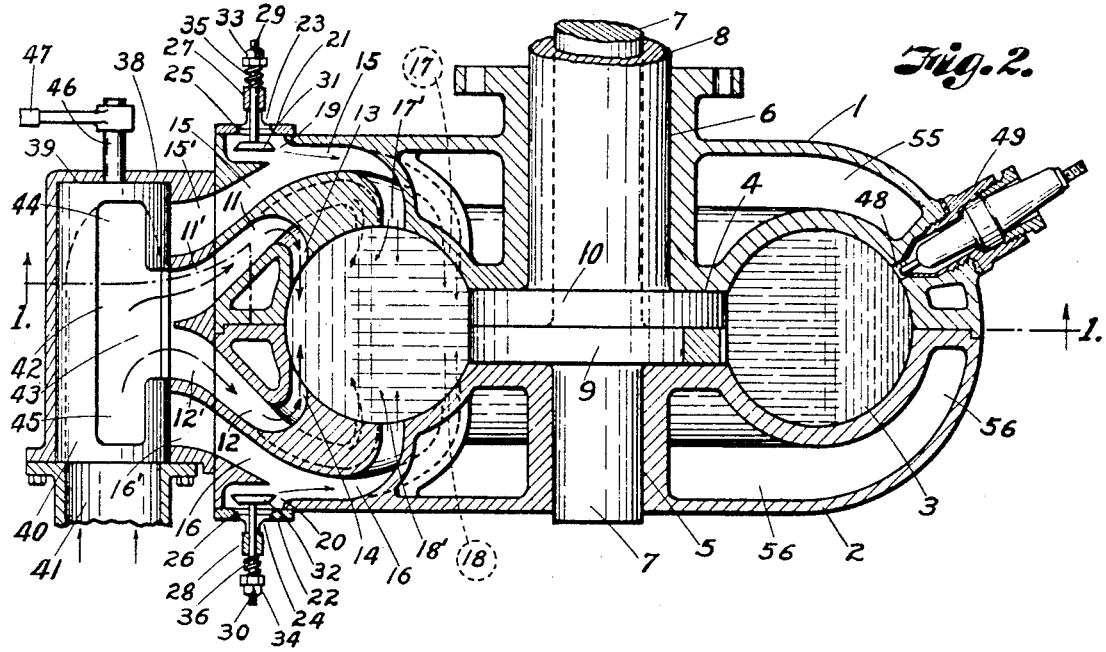
Fig. 2.
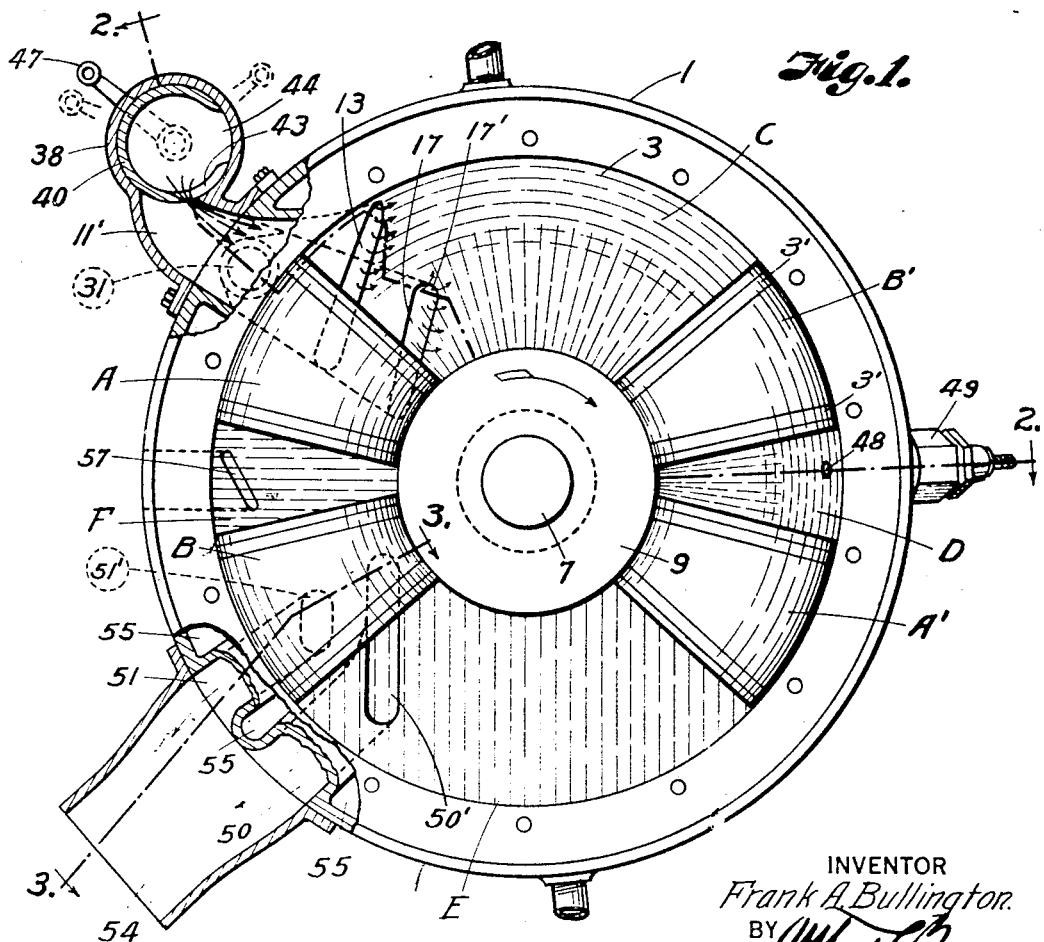
Fig. 1.
INVENTOR
Frank A. Bullington.
BY
ATTORNEY INVENTOR
Frank A. Bullington
BY
ATTORNEY Patented Oct. 27, 1931

1,829,391

UNITED STATES PATENT OFFICE

FRANK A. BULLINGTON, OF KANSAS CITY, MISSOURI, ASSIGNOR TO BULLINGTON MOTORS, OF KANSAS CITY, MISSOURI, A COMMON-LAW TRUST CONSISTING OF SOLOMON STODDARD, ERNEST E. HOWARD, AND FRANK A. BULLINGTON

ROTARY INTERNAL COMBUSTION ENGINE

Application filed January 14, 1927, Serial No. 161,123. Renewed March 20, 1931.

My invention relates to rotary engines of the following rotating piston type disclosed in United States Letters Patent No. 1,568,052 granted to me January 5, 1926, wherein advantage of full expansion of exploded gases is secured by differential in compression and expansion ratios and by stratification of proportional charges of live and inert gases to insure constant compression irrespective of variations in motor power and speed, the present invention relating particularly to the intake of fuel and secondary volumetric fluid and having for its principal object to so proportion and dispose the charges as to secure maximum efficiency in operation of the engine.

An object of the invention is to provide an engine cylinder having substantial inlet capacity, and in accomplishing this object I provide a long narrow inlet port arranged obliquely to the path of travel of a piston in the cylinder in order that a sealing ring on the piston, when passing the port, will present a relatively small exposed area to the port opening, the exposed area progressing lengthwise of the ring as the latter travels by (or over) the port in order to equalize wear on the ring surface.

In accomplishing the above and other objects of the invention I have provided improved details of structure, having particular reference to the form and arrangement of the engine cylinder ports, both for inlet and exhaust of the engine working fluids, the preferred forms of which are illustrated in the accompanying drawings which show the engine cylinder parts only, the Letters Patent above noted being available for disclosure of the transmission mechanism employed in connection with the power initiating elements.

My invention is herein illustrated and described as an embodiment of a four cycle, annular cylinder engine in which pistons revolve and have relative motion with respect to each other, constituting simultaneous stroke movements, spaces being formed between the pistons to comprise working chambers, each working chamber adapted to have a cycle of action in one revolution, the cycle comprising intake, compression, expansion and exhaust actions.

In the accompanying drawings,

Fig. 1 is an inside view of one-half (hereinafter termed the body section) of the cylinder casing, the other half (hereinafter termed the cover section) being removed to show the pistons, the working chambers between the pistons, the intake, exhaust, and ignition ports and the valves for controlling intake of fuel and secondary volumetric fluids, and to illustrate the stratified disposal of the fluids in the working chambers, parts being in section on the line 1—1 of Fig. 2.

Fig. 2 is a sectional view on the irregular line 2—2, Fig. 1, the arrows indicating flow of fuel and secondary volumetric fluid from their initial ports to the cylinder chamber and their stratified disposal in the working chamber.

Figure 5:
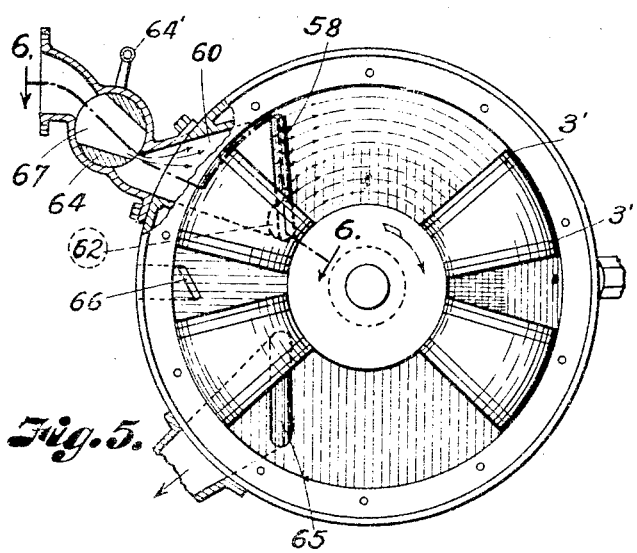
Fig. 5 is an elevational view of an engine of the same type, but employing modified forms of fuel and air inlet ports and a modified form of throttle valve.

Referring more in detail to the drawings:

1 designates the body section of the cylinder casing and 2 its cover section, formed and combined to provide the annular cylinder chamber 3, annular rotor throat 4, and bearings 5, 6 for the piston shafts 7, 8; the shaft 8 being tubular and rotatable on the shaft 7. Fixed on the shafts 7—8 are rotors 9—10, each carrying pairs of pistons A, A' and B, B', each having piston rings 3' bearing on the wall of the cylinder chamber 3 and corresponding in structure, function and operation with similar parts of the engine illustrated in the Letters Patent above mentioned; working chambers C, D, E and F being formed between the pistons in the cylinder chamber 3.

Opening through the periphery of the body and cover sections 1—2 are primary fuel inlet passageways 11 and 12, radially disposed in the body and cover sections respectively, both passages leading about the cylinder chamber 3 and opening thereto in a direction substantially parallel with the axis of the annular cylinder through the inlet ports 13, 14, extending obliquely outward in the direction of travel of a piston having clockwise movement in the engine cylinder, the ports 13—14 being disposed oppositely to each other so that a fluid fuel medium entering the cylinder casing is divided for flow through the respective passages 11—12, and the two equal components of the divided fuel charge being directed against each other at their entrance into the working chamber to absorb the inertia of their flows in order to permit the fuel charge to follow the suction piston in a stratum in its working chamber.

In addition to the passages 11 and 12 the body and cover sections are provided with additional or secondary inlet passages 15 and 16 arranged outwardly of the passages 11 and 12 and opening to the piston chamber through secondary inlet ports 17 and 18 arranged radially inward of and substantially parallel to the ports 13 and 14 in that they are inclined outwardly in the direction of clockwise movement of the pistons, those portions of the passages 15 and 16 directly adjacent their inlet ports 17 and 18 being disposed substantially at right angles to the annular cylinder and parallel with its axis.

The passages 15 and 16 are for the supply of fuel fluid to the engine when the latter is operating at full capacity, or substantially full capacity, and a full fuel charge is required. When, however, the motor is operating under low power, i. e., when the fuel supply is throttled, an auxiliary volumetric fluid may be admitted to the working chambers through the passages 15 and 16 and supplement the volume of fuel fluid to fill the working chambers in order that a constant initial volume for compression may be secured irrespective of the volume of fuel fluid admitted to the chambers, the secondary fluid being admitted through the inlet ports delivering to the inner radial portion of the working chambers in order to stratify the contents of the working chambers, with the stratum of fuel fluid at the outside where it may be most effectively ignited by ignition means preferably located near the outer periphery of the annular chamber.

The secondary volumetric fluid is supplied through branches 19 and 20 of the passages 15 and 16 which open through the side walls of the body and cover sections of the engine casing, the mouths of the branches being covered by plates 21—22 having ports 23—24 and valve seats 25—26.

The plates 21 and 22 carry spiders 27 and 28 and slidably mounted in the spiders are valve stems 29 and 30 having valves 31 and 32 at their inner ends and nuts 33 and 34 at their outer ends, springs 35 and 36 surrounding the stems and bearing against the spider and nuts to yieldingly urge the valves to their seats.

It is apparent from the foregoing that, when flow through the passages 15 and 16 is un-interrupted, the valves 31 and 32 will remain seated and only fuel fluid be delivered to the working chambers. If the flow through the passages 15 and 16 should be obstructed, suction in the working chambers will draw the valves from their seats and admit air to the working chambers to serve as an inert volume filler for maintaining a substantially constant initial volume for compression. The valves may be regulated to admit air proportionately to the admission of fuel fluid for maintaining the constant initial volume in the working chamber and to equalize the volume of intake at opposite sides of the casing.

Admission of fuel fluid to the cylinder is controlled by a throttle valve, preferably of the form shown in the drawings, comprising a housing 38 having a chamber 39 containing a hollow cylindrical valve member 40 open at one end to communicate with the fuel supply conduit 41.

The housing 38 is provided with a base portion having fuel inlet passages 11', 12', 15' and 16' having port openings to the valve chamber 39 and registering respectively with the fuel inlet passages 11, 12, 15 and 16 in the body and cover sections of the cylinder casing.

The valve 40 is provided with an irregularly shaped port 42 through its wall, arranged lengthwise of the valve and having a wide middle portion 43 and end portions 44 and 45 of restricted width. The valve port being so arranged that the wide portion 43 will be completely opened to the primary inlet passages 11 and 12 before the end portions 44 and 45 start to open to the secondary passages 15 and 16, the wider portion continuing to be fully open while the end portions are being fully opened.

The valve 40 is provided with a stem 46 journalled in an opening in the end of the housing and having an operating handle 47, whereby the valve may be adjusted for providing any desired regulation of fuel intake.

The cylinder casing is provided with an ignition port 48 and spark plug 49, as in the prior forms of my engine, and the body and cover sections of the casing are provided with exhaust passages 50, 51 and 52, 53 having respective cylinder ports 50', 51' and 52', 53' arranged at an incline, inwardly relative to clockwise travel of the pistons and in substantially reverse arrangement to the fluid supply ports heretofore described.

The exhaust passages, arranged substantially radial in the casing sections, are provided to conduct the exhaust gases to the outlet manifold 54 mounted on the casing and so as to be surrounded by cooling water contained in the water jacket spaces 55 and 56 of the casing sections 1 and 2.

The body and cover sections are also provided with auxiliary secondary exhaust ports 57 to provide a separate final outlet for the discharge of burned gas from the working chambers.

Assuming the parts to be constructed and assembled as described, when the engine is operating with a partially opened throttle, the fuel fluid is delivered through conduit 41, and thence through the valve and its port at its wide portion 43 into the primary passages 11—12 and thence into the cylinder, the secondary passages 15 and 16 being closed to the fuel fluid inlet. With the secondary passages closed off as described, fuel fluid is drawn into the working chamber, but not in sufficient volume to fill the chamber. Suction in the chamber will, however, be transmitted into the secondary passages, operating the automatic valves to open them and admit air in sufficient quantities to fill the working chamber, the fuel fluid stratifying in the outer portion of the chamber and the secondary fluid, or air, at the inner portion, the stratification being continued during operation of the engine so that at the time of explosion there will not be such mixture of the two fluids as to interfere with or retard the explosion.

The engine operation just described is illustrated in Figs. 1 and 2. In Fig. 1 the pistons are shown in their relative positions at the approximate beginning of their simultaneous stroke actions, the working chambers C, D, E and F, between the pistons being shown in four successive positions of the cycle of action, as follows:

Chamber C at about the end of its intake action ready to begin its compression action, the inlet ports about to be closed; chamber D at the end of its compression action, registered with the ignition port ready to have the charge ignited and begin its power expansion action; chamber E at about the end of its expansion action, registered with the main exhaust ports and about to begin its exhaust action; chamber F at about the end of its exhaust action, registered with the secondary exhaust port and about to begin its intake action.

In chamber C the component fluids of the working charge are disposed in strata, the fuel being the outer stratum and the air the inner stratum. Between these two strata occurs a zone or stratum of mingled fluids comprising a very lean fuel mixture combustible only under the pressure and temperature resulting from the combustion of the fuel fluid proper in the outer stratum.

This stratified arrangement of the component fluids is due partly to the form and arrangement of the inlet ports and passages as previously described, and further to the fact that the throttle valve is arranged to have its port opened initially to that side of the fuel inlet passage nearest to the outer end of its cylinder port (Fig. 1). The fact that the outer radial half of the working chamber is of greater volumetric capacity than the inner half also contributes to the desired stratification of the working charge. A working charge thus properly disposed in strata during the intake action of its working chamber is then relatively static in the chamber and will remain in strata during the compression action so that when compression is completed, the ignitable fuel stratum will register with the ignition port and spark plug as illustrated in chamber D.

In this invention, as in my patent herein referred to, the object of providing fuel stratification and a constant initial working charge volume in each working chamber is to provide a means whereby any given quantity of fuel, less than a full charge, will be subjected to the same compression action and receive the same compression pressure and therefore be equally as efficient in developing power during combustion as though it were a component part of a full fuel charge.

Another object obtained by this invention is that of supplying to the working chambers a full volume charge of fuel fluid, disposed in concentric strata, the stratum at the outer side of greater heat unit density than that of the stratum at the inner side, the heat unit density of the outer stratum being sufficient for ignition by spark means, the heat unit density of the inner stratum adapted to be varied without effecting the heat unit density of the outer stratum.

The engine is adaptable for use with either a gaseous or a hydrocarbon fuel mixture.

When the throttle valve port 42 is advanced so that the end portions 44 and 45 are partially opened to the secondary inlet passages 15' and 16' admitting fuel thereto, the suction in the cylinder is reduced and effects a corresponding reduction in the amount of air drawn into the secondary inlet passages. The supplemental air inlets are so arranged that the air and fuel are mixed in a manner to provide a differential in the density of fuel in the mixture so that the more dense, or richer, portion enters the cylinder at the outer ends 17' and 18' of the secondary inlet ports 17 and 18. Thus the stratum of secondary volumetric fluid becomes a lean fuel mixture which may be ignited only by the combustion of the richer fuel stratum.

Figure 4:
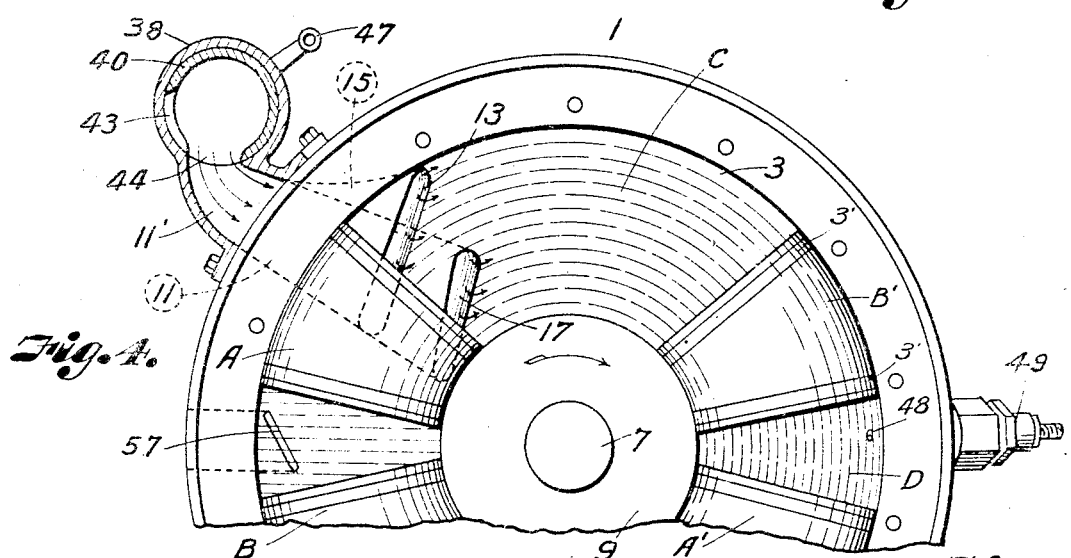
Fig. 4 is an elevational view of a part of the engine with the casing cover section removed, the fuel inlet valve being in section on the line 1—1 Fig. 2 and shown fully opened.
Figure 3:
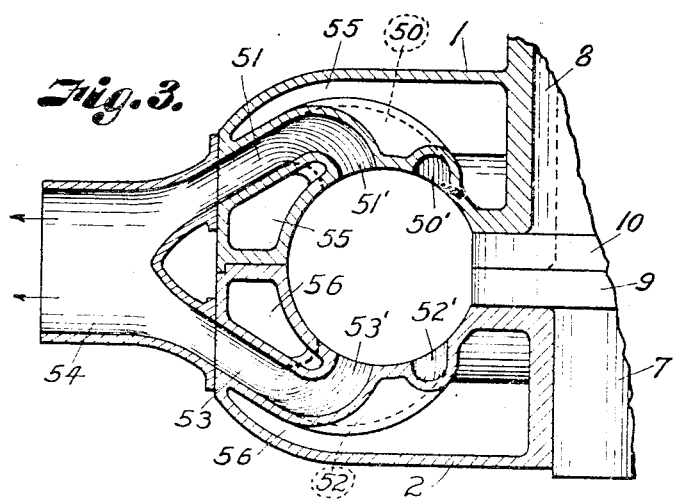
Fig. 3 is a sectional view on the line 3—3, Fig. 1, particularly illustrating the exhaust ports.

When the throttle valve port is completely opened to all the inlet passages, as shown in Fig. 4, the suction in the engine cylinder will be so reduced that the air supply valves will remain closed and a full charge of fuel fluid will be supplied to the working chambers for operation of the engine at full power.

Figure 6:
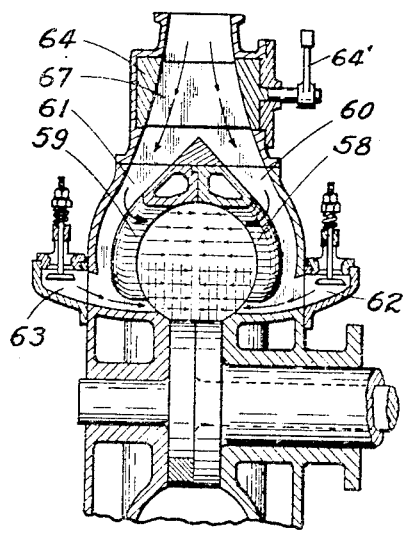
Fig. 6 is a sectional view on the irregular line 6—6, Fig. 5.

The operation of the modified form of engine illustrated in Figs. 5 and 6 is the same as that of the preferred form, the cylinder inlet ports 58 and 59, the inlet passages 60 and 61, the secondary fluid inlet ports and valves 62 and 63, the fuel throttle valve 64 and the exhaust ports 65 and 66 all perform the same functions in the same manner as in the preferred form, having particularly reference to the secondary inlet means for fuel or secondary volumetric fluid in the preferred form.

Particular reference is made to the fact that the cylinder has only one inclined inlet port and one inlet passage on each side, the inlet ports being located opposite to each other and the secondary volumetric fluid inlet ports and valves located adjacent the inner extremity of the inlet passages. The throttle valve 64 is provided with an opening 67 through it for the passage and direct control of the engine fuel supply and indirect control of the secondary fluid supply, substantially the same as in the preferred form.

Figure 7:
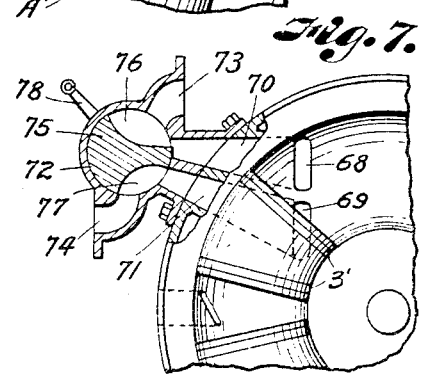
Fig. 7 is a fragmentary, elevational view of an engine of the same type having a modified form of throttle valve for positive control of the fuel and air inlet.

Fig. 7 shows a modified form of inlet control valve and suitable inlet ports and passages adapted for positive valve control of both the fuel fluid and the secondary volumetric fluid supply to the engine. The cylinder is provided with a primary fuel inlet port 68 and a secondary fluid inlet port 69 having separate inlet passages 70 and 71 respectively leading from the control valve chamber 72. The valve chamber is provided with a fuel supply inlet 73 and a secondary fluid inlet 74. The inlet valve 75 in the valve chamber 72 is provided with a fuel inlet passage 76, a secondary fluid inlet passage 77 and a valve control lever 78. This arrangement provides a positive means for throttling the two fluids inversely to each other, that is, when the fuel fluid inlet means is closed the secondary fluid inlet means is open and when the fuel fluid inlet means is fully opened the secondary fluid inlet means is positively closed.

I am aware that other modifications and arrangements of parts may be employed and I, therefore, do not wish to be limited in the use of my invention except as I may be limited by the following claims.

What I claim and desire to secure by Letters Patent is:

1. In an engine of the character described, a cylinder casing, an annular cylinder and pistons rotatable in the cylinder, the cylinder casing having a plurality of fuel passages having radially spaced connections with the cylinder chamber and having an air port opening to the passage leading to the innermost of said connections.

2. In an engine of the character described, a cylinder casing, an annular cylinder and pistons rotatable in the cylinder, the cylinder casing having a plurality of fuel passages having radially spaced connections with the cylinder chamber and having an air port opening to the passage leading to the innermost of said connections, and an automatic valve controlling intake through said air port.

3. In an engine of the character described, a cylinder casing, an annular cylinder and pistons rotatable in the cylinder, the cylinder casing having separate passages opening to the cylinder chamber in radially spaced relation, a valve having an initial port opening for communication only with the passage leading to the outer radial connection with the cylinder chamber and a supplemental port opening communicatable with all of the passages upon extended opening movement of the valve.

4. In an engine of the character described, a cylinder casing, an annular cylinder and pistons rotatable in the cylinder, the cylinder casing having separate inlet passages opening to the cylinder chamber in radially spaced relation, an inlet control valve having a port of irregular form adapted to have initial opening for communication only with the passages leading to the outer radial connections with the cylinder chamber and a supplemental opening communicatable with all of the passages upon extended opening movement of the valve.

5. In an engine of the character described, a cylinder casing, a valve chamber on the casing, an annular cylinder and pistons rotatable in the cylinder, the cylinder having primary and secondary passages leading through the periphery of its casing to the valve chamber, a valve having an irregularly shaped port initially communicatable only with the primary passages and with all of said passages upon extended opening movement of the valve.

6. In an engine of the character described, a cylinder casing, a valve chamber on the casing, an annular cylinder and pistons rotatable in the cylinder, the cylinder having primary and secondary passages leading through the periphery of its casing to the valve chamber, an inlet valve having a port of progressive capacities initially communicatable only with the primary passages and with all of said passages upon extended opening movement of the valve, the cylinder casing having air ports opening to the secondary passages.

7. In an engine of the character described, an annular cylinder and pistons rotatable in the cylinder, the cylinder having primary and secondary passages leading through its periphery to the valve chamber, a valve having a port of graduated capacities initially communicatable only with the primary passages and with all of said passages upon extended opening movement of the valve, the cylinder having air ports opening to the secondary passages and valves controlling said air ports.

8. In an engine of the character described, an annular cylinder and pistons rotatable in the cylinder, the cylinder having primary and secondary passages leading through its periphery to the valve chamber, a valve having a port initially communicatable only with the primary passages and with all of said passages upon extended opening movement of the valve, the cylinder having air ports opening to the secondary passages, and inwardly opening, automatic valves controlling the air ports.

9. In an engine of the character described, a cylinder casing, an annular cylinder therein, pistons rotatable in the cylinder, working chambers formed by the pistons, the cylinder casing having a fuel inlet control valve and inlet passages leading from the fuel inlet valve to oppositely spaced cylinder inlet ports, air ports open to the inlet passages and valves for the air ports adapted to be opened to effect delivery of working fluids to the working chambers in strata and to supply a constant initial charge volume to said working chambers.

10. In an engine of the character described, a cylinder casing, an annular cylinder therein, pistons rotatable in the cylinder, working chambers formed by the pistons, the cylinder casing having a fuel inlet control valve and inlet passages leading from the fuel inlet valve to oppositely spaced cylinder inlet ports, and secondary volumetric fluid inlet means controlled by said fuel inlet valve to be effective in introducing fuel fluid and secondary volumetric fluid into the working chambers in strata and to supply a constant initial charge volume to said working chambers.

In testimony whereof I affix my signature.

FRANK A. BULLINGTON.